Patented Aug. 19, 1952

2,607,660

UNITED STATES PATENT OFFICE 2,607,660

PURIFICATION OF WATER-SOLUBLE SUBSTANCES

Harold Eugene Robertson, Syracuse, and Eugene Baker Port, Baldwinsville, N. Y., assignors to Allied Chemical & Dye Corporation, a corporation of New York No Drawing. Application November 7, 1946, Serial No. 708,458

4 Claims. (Cl. 23—64)

This invention relates to an improvement in purification of materials and especially to an improved process for washing water-soluble impurities from finely divided water-soluble substances.

In the manufacture of various materials it is conventional practice to precipitate the material in crystalline form from mother liquor, separate the crystals from the liquor by filtering or centrifuging, and then wash the cake of crystals with water to remove adherent mother liquor and water-soluble impurities. Thus, in the manufacture of sodium bicarbonate, the bicarbonate crystals are precipitated by ammoniation and carbonation of an aqueous solution of sodium chloride and are separated from the mother liquor by filtering or centrifuging. The resultant bicarbonate crystals are then washed with water to remove adherent mother liquor and water-soluble impurities such as sodium and ammonium chlorides. The mother liquor is retained by capillarity in the small interstices between crystals and in crystal cavities and is difficult to remove. Washing is a relatively expensive operation involving use of large amounts of wash water and entails significant losses of bicarbonate owing to solubility of the bicarbonate in the wash water. These disadvantages have long been recognized and various expedients have been resorted to in an effort to reduce the extent of washing necessary to produce a product of the desired purity, such as provision of pressure rollers on the filter wheels for the purpose of squeezing liquor out of the filter cake. Such expedients have not significantly expedited the washing operation. Similar difficulties are encountered in washing mother liquor and water-soluble impurities from water-soluble particles generally, particularly solids of a particle size such that the mother liquor is retained therein by capillary action.

It is an object of the invention to provide a novel process of improved effectiveness for the removal of adherent water and water-soluble impurities from water-soluble particles.

It is another object of the invention to provide an improved process for removal of adherent mother liquor and water-soluble impurities from masses of water-soluble crystals containing interstices of capillary size.

It is a further object of the invention to improve the washing of sodium bicarbonate filter cake containing mother liquor and water-soluble impurities retained by capillarity in the cake. Other objects and advantages will appear hereinafter.

In accordance with the invention, water-soluble particles of materials wet with aqueous liquor and water-soluble impurities are washed with water containing a wetting agent. The invention is particularly applicable to washing water-soluble crystal masses containing capillary interstices, which masses are recovered by filtration or other dewatering operation from aqueous mother liquor containing water-soluble impurities. In the preferred embodiment of the invention, masses of sodium bicarbonate crystals obtained by ammoniation and carbonation of sodium chloride brine and filtration or centrifuging of the resultant liquor, which masses contain interstices and cavities of capillary size having adherent mother liquor therein are washed with wash water containing sufficient wetting agent to lower substantially the surface tension of the water.

This washing process accomplishes removal of mother liquor and water-soluble impurities more effectively and permits use of less wash water to obtain filter cake of a given standard of purity than conventional washing with water containing no wetting agent. Further, filter cake of higher purity is obtainable by using a given amount of wash water containing a wetting agent than can be produced by conventional washing processes employing the same amount of water free from wetting agent. The reduction of the amount of wash water to effect a given degree of purification not only substantially reduces the cost of the washing operation but diminishes loss of the product by dissolution in the wash water. In processes where it is desirable to recover the product dissolved in the wash water, this may be accomplished at less cost than where no wetting agent is utilized.

It is believed that the improved results obtained by employing a wetting agent in water for washing crystal masses are due largely to the fact that the agent substantially lowers the surface tension of the wash water and reduces the tenacity with which it and the mother liquor are held by capillary action in the interstices and cavities of the crystal masses. Thus the wetting agent promotes more complete drainage of the wash water and mother liquor, together with dissolved impurities, from the masses. It will be observed that the action of the wetting agents is not the same as in processes in which wetting agents are employed for penetrating, emulsifying, dispersing, solubilizing and cleaning purposes; for example, treatment of fibers to effect penetration of treating solutions, dispersal of pigments in finely-divided form, and ordinary cleansing operations in which the agents act as emulsifiers. That this is true is evident from the fact that concentrations of wetting agents too small to have any material effect as detergents, e. g. in washing textiles, produce a substantial improvement in the process of the invention.

In general, materials having high surface tension depressant properties may be employed in carrying out the invention. Many suitable materials are commercially available, such as those listed as wetting agents in the following publications: Industrial and Engineering Chemistry, vol. 35, No. 1 (January 1943) pages 126-130, and Bulletin of the National Formulary Committee, vol. X, No. 8-9, August-September, 1942. The agents are, in general, materials which contain polar and non-polar groups and may be of either the anion-active or cation-active type. Among the important classes of compounds suitable for use in accordance with the invention are the anion-active wetting agents, such as alkyl aryl sulfonates and aliphatic sulfates and sulfonates. The particular agent selected depends upon various factors such as its cost, relative effectiveness in depressing surface tension, and the conditions under which the agent is to be used. Thus, for example, agents which are ineffective in alkaline media should not be employed for washing materials of alkaline character such as sodium bicarbonate, and agents which are ineffective in acid media should not be employed for washing materials of acid character. Further, agents which are precipitated by calcium and magnesium compounds should not be employed in conjunction with hard water or for washing materials consisting of or containing substantial amounts of such compounds. Various agents, such as those commercially available as "Nacconol NR," "Nytron," and "Ultrawet," are effective in hot and cold water under acid and alkaline conditions and are not precipitated by alkaline earth and magnesium salts. Such agents, which may be used under a wide range of conditions, are ordinarily preferred. Nytron is a registered trade-mark for a detergent product manufactured by Allied Chemical & Dye Corporation under United States Patent 2,265,993 and comprising the sulfitation product of the addition product of nitrosyl chloride and olefins containing 12 to 23 carbon atoms. The product comprises organic sulfonates including sulfonated ketones, sulfonated amines, sulfonated alkylidene sulfamates, sulfonated alkyl sulfamates and bisulfite addition products of sulfonated alkylidene sulfamates in the form of sodium salts.

The wetting agent should be employed in amount sufficient to lower materially the surface tension of the wash water. Good results may be obtained by employing a sufficient amount of the wetting agent to reduce the surface tension of the water to 50-65 dynes per cm. Ordinarily it is not economical to employ more than about 0.01% of the wetting agent in the wash water.

Very small amounts of effective wetting agents are sufficient to improve markedly the efficiency of the washing operation; for example, 0.0025%, based on the weight of the water, of wetting agents such as those commercially available under the designations previously mentioned substantially reduce the amount of wash water necessary to obtain sodium bicarbonate filter cake of a given standard of purity.

The following examples are illustrative of preferred embodiments of the invention:

EXAMPLE 1

Two similar small filter wheels A and B, having similar filter-cake washing equipment employed for recovery of sodium bicarbonate from mother liquor resulting from ammoniation and carbonation of sodium chloride brine by the ammonia soda process, were utilized in this example. The rates of flow of wash water to the respective wheels were adjusted to give sodium bicarbonate filter cakes of substantially equal sodium chloride content. Wetting agent was then added to the water employed for washing the filter cake of wheel A and the rate of flow of wash water to this wheel A was reduced until sodium chloride content of the filter cake therefrom was equal to that from wheel B. The filters were operated under vacuum of 24 to 28 cm. mercury and the thickness of the filter cakes ranged from 1¼" to 1¾". The wetting agent employed was that sold under the commercial designation "Nacconol NR" and contained a little less than 40% of alkyl aryl sulfonate and about 60% of sodium sulfate. The filter cakes were analyzed periodically for sodium chloride content. The results of this example are tabulated below:

Table 1

| Minutes from Start of Test | Percent Wetting Agent to Filter A | Wash Water (cu. m. per hour) | | Percent NaCl in Filter Cake | |
|---|---|---|---|---|---|
| | | To A | To B | Filter A | Filter B |
| at start | .0000 | 5.4 | 5.8 | .09 | .10 |
| 30 | .0025 | 4 | 5.8 | .06 | .08 |
| 60 | .0025 | 4 | 5.8 | .07 | .10 |
| 80 | .0025 | 4 | 5.8 | .05 | .07 |
| 100 | .0025 | 4 | 5.8 | .07 | .07 |
| 120 | .005 | 4 | 5.8 | .10 | .07 |
| 140 | .005 | 4 | 5.8 | .09 | .07 |
| 160 | .005 | 4 | 5.8 | .14 | .11 |
| 180 | .005 | 4 | 5.8 | .09 | .10 |

It will be observed that when the wetting agent was incorporated in the wash water about 25% less wash water was required to obtain filter cake of approximately 0.1% sodium chloride content than when no wetting agent was utilized. This amount of wash water employed on filter A would have resulted in filter cake of about 0.35% sodium chloride content if the wetting agent had not been utilized.

EXAMPLE 2

This example was carried out with 2 large filter wheels C and D employing the same procedure and wetting agent as in Example 1. The results of this example are tabulated below:

Table 2

| Minutes from Start of Test | Percent Wetting Agent to Filter C | Wash Water (cu. m. per hour) | | Percent NaCl in Filter Cake | |
|---|---|---|---|---|---|
| | | To C | To D | Filter C | Filter D |
| at start | .0000 | 6.3 | 6.3 | .23 | .26 |
| 30 | .0025 | 5 | 6.3 | .25 | .22 |
| 60 | .0025 | 5 | 6.3 | .28 | .20 |
| 80 | .0025 | 5 | 6.3 | .30 | .30 |

It will be observed that the incorporation of the wetting agent in the wash water employed to wash the filter cake of wheel C resulted in reduction of about 20% in the amount of water required to produce filter cake of about 0.25% sodium chloride content. In this example the amount of wash water used on filter C would have produced filter cake of about 0.50% sodium chloride content if the wetting agent had not been utilized.

EXAMPLE 3

A filter wheel employed for recovery of sodium bicarbonate in the ammonia-soda process was adjusted to yield filter cake of 0.34% sodium chloride average content. Thereafter, 0.005% of an organic sulfonate wetting agent of the type described in Example 1 of U. S. Patent 2,373,643, was added to the wash water without varying the rate of flow of the water. The sodium chloride content of the filter cake dropped to an average of about 0.22%.

EXAMPLE 4

Two large similar filter wheels E and F having similar filter cake washing equipment, employed in the ammonia-soda process for recovery of sodium bicarbonate from mother liquor resulting from ammoniation and carbonation of sodium chloride brine, were employed in this example. The rates of flow of wash water through the respective filters were adjusted to give sodium bicarbonate filter cakes of substantially equal sodium chloride content. A wetting agent was then added to the water employed for washing the filter cake of wheel E and the rate of flow of wash water to this wheel was then reduced until the sodium chloride content of the filter cake therefrom was equal to that of the cake from wheel F. Thereafter the above procedure was repeated except that the wetting agent was added to the wash water from wheel F instead of to that for wheel E. The wetting agent was employed in concentration of 0.01% based on the weight of the wash water. The results of the above operations are tabulated below:

Table 3

|  | Percent Wetting Agent to Filter | Wash Water (cu. m. per hour) | Percent NaCl (average) in Filter Cake |
| --- | --- | --- | --- |
| Filter wheel E | .01 | 5.2 | .28 |
| Filter wheel F | none | 6.6 | .28 |
| Filter wheel E | none | 6.3 | .33 |
| Filter wheel F | .01 | 5 | .33 |

The results of this example indicated that use of the wetting agent reduced by about 20% the volume of wash water necessary to produce filter cake of the sodium chloride content indicated. In Example 4, "Nacconol NR" was employed as the wetting agent. Repetition of the example using as wetting agents the material commercially known as "Ultrawet" and the organic sulfonate wetting agent used in Example 3, respectively, in concentrations of from 0.01% to 0.0025% resulted in similar reduction of the amount of wash water required to yield filter cake of given purity.

In each of the above examples the percentage of wetting agent is based on the weight of the water and the percentage of sodium chloride is by weight, dry soda ash basis.

Thus, it will be seen, the invention provides a process for effective removal of adherent mother liquor and water-soluble impurities from masses of particles containing interstices in which the liquor and impurities are held by capillary action. The invention is applicable to washing of masses of water-soluble crystals recovered from aqueous liquor by operations such as centrifuging and filtration but may also be employed for washing masses recovered by other methods such as classification. While the specific examples exemplify washing only of sodium bicarbonate filter cake, the invention is applicable to washing many other masses of water-soluble particles such as the chlorides, nitrates, phosphates and sulfates of sodium, potassium, and ammonium; sodium and potassium nitrite; potassium carbonate and bicarbonate; potassium and sodium chromates; sodium and potassium sulfites; and sodium acetate.

Since certain changes may be made without departing from the scope of the invention, it is intended that the above shall be interpreted as illustrative and not in a limiting sense.

We claim:

1. The method of washing water-soluble particles of the group consisting of alkali-metal and ammonium salts wet with an aqueous solution of impurities of said group, which comprises washing the wet particles with water substantially free of said impurities and containing a wetting agent.

2. The method of washing water-soluble particles of the group consisting of alkali-metal and ammonium salts wet with an aqueous solution of impurities of said group, which comprises washing the wet particles with water substantially free of said impurities and containing sufficient anion-active wetting agent to reduce the surface tension of the water below 65 dynes.

3. A process for the removal of an aqueous solution of impurities of the group consisting of water-soluble alkali-metal and ammonium salts from the interstices of a mass of water-soluble particles of said group containing interstices of capillary size, which comprises washing said mass with water substantially free of said impurities and containing sufficient anion-active wetting agent to reduce the surface tension of the water below 65 dynes, but not in excess of 0.01% by weight of the wash water.

4. A process for the removal of water containing dissolved chloride impurities from the interstices of a mass of sodium bicarbonate crystals containing interstices of capillary size, which comprises washing said mass with water substantially free of said impurities and containing sufficient anion-active wetting agent to reduce the surface tension of the water below 65 dynes, but not in excess of 0.01% by weight of the wash water.

HAROLD EUGENE ROBERTSON.
EUGENE BAKER PORT.

REFERENCES CITED

The following references are of record in the file of this patent:

UNITED STATES PATENTS

| Number | Name | Date |
| --- | --- | --- |
| 357,824 | Hawliczek | Feb. 15, 1887 |
| 2,109,575 | Parsons | Mar. 1, 1938 |
| 2,137,404 | Hollerer | Nov. 22, 1938 |